(12) United States Patent
Otake

(10) Patent No.: US 12,522,269 B2
(45) Date of Patent: Jan. 13, 2026

(54) SHOPPING SUPPORT APPARATUS, SHOPPING CART, AND METHOD FOR SHOPPING SUPPORT

(71) Applicant: Toshiba Tec Kabushiki Kaisha, Tokyo (JP)

(72) Inventor: Atsushi Otake, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 119 days.

(21) Appl. No.: 18/339,919

(22) Filed: Jun. 22, 2023

(65) Prior Publication Data
US 2024/0182097 A1  Jun. 6, 2024

(51) Int. Cl.
| | |
|---|---|
| B62B 3/14 | (2006.01) |
| G06F 3/04817 | (2022.01) |
| G06F 3/0482 | (2013.01) |
| G06Q 20/32 | (2012.01) |

(Continued)

(52) U.S. Cl.
CPC ........ B62B 3/1424 (2013.01); G06F 3/04817 (2013.01); G06F 3/0482 (2013.01); G06Q 20/3276 (2013.01); G06Q 20/4014 (2013.01); G06Q 30/0635 (2013.01); G06Q 30/0639 (2013.01); G06Q 30/0641 (2013.01)

(58) Field of Classification Search
CPC .... G06F 3/04817; G06F 3/0482; G06F 9/451; G06F 3/0484; G06Q 20/3276; G06Q 20/4014; G06Q 30/0635; G06Q 30/0639; G06Q 30/0641; G06Q 30/0633; G06Q 30/0623; G06Q 30/0631; G06Q 30/0643; B62B 3/1424; B62B 3/1428; B62B 5/00
See application file for complete search history.

(56) References Cited

U.S. PATENT DOCUMENTS

| | | | | |
|---|---|---|---|---|
| 2012/0226556 A1* | 9/2012 | Itagaki | ................ | G07G 1/0081 |
| | | | | 705/14.64 |
| 2017/0186068 A1* | 6/2017 | Dumouchel | ....... | G06Q 30/0643 |
| 2018/0260885 A1* | 9/2018 | Binafard | ................ | G06Q 20/12 |

FOREIGN PATENT DOCUMENTS

JP   2019220089 A   12/2019

OTHER PUBLICATIONS

Chara Gravani and Stefano Vozza, "How a Grocer Can Deliver Personalized Experiences with Recipes", Nov. 11, 2021, pp. 1-9 (Year: 2021).*

(Continued)

*Primary Examiner* — Sisay Yacob
(74) *Attorney, Agent, or Firm* — Kim & Stewart LLP

(57) ABSTRACT

According to one embodiment, a shopping support apparatus for a retail store includes a display screen and a control unit. The control unit causes a store map to be displayed on the display screen and acquires a commodity code for a commodity for sale in the store to register the commodity corresponding to the acquired commodity code in a sales transaction. The sales transaction list is displayed on the display screen along with a button for requesting a recipe for a dish including the commodity. The control unit acquires recipes for dishes including the commodity for when the button is pressed, and then displays images associated with the acquired recipes on the display screen along with an ingredient list button for each. An ingredients list for a selected dish is shown for a dish when selected and a location of any unregistered ingredient is displayed on the store map.

17 Claims, 10 Drawing Sheets

(51) Int. Cl.
*G06Q 20/40* (2012.01)
*G06Q 30/0601* (2023.01)

(56) References Cited

OTHER PUBLICATIONS

Phillip T., "RecipEat: Recommending Recipes to Eat, aMulti-label Image Classification Problemusing Neural Networks", Sep. 15, 2017, pp. 1-9 (Year: 2017).*
Extended European Search Report dated Nov. 8, 2023, mailed in counterpart European Application No. 23189195.3, 10 pages.

* cited by examiner

| COMMODITY | NUMBER | PRICE |
|---|---|---|
| COMMODITY REGISTRATION | | |
| PORK BELLY | 1 | 590 |
| CARROT BAG | 1 | 95 |
| POTATO BAG | 1 | 228 |

TOTAL  3 POINTS  913 YEN

DISH 430  420

FIG. 7

| POSITION DISPLAY | COMMODITY NAME | QUANTITY | COLLECTION |
|---|---|---|---|
| ☐ | CARROT | 2 | (DONE) |
| ☐ | POTATO | 2 | (DONE) |
| ☑ | ONION | 1 | |
| ☐ | PORK | 200g | (DONE) |
| ☑ | CURRY POWDER | 1 BOX(150g) | |
| | | | |

INGREDIENTS OF DISH A (FOR 4 PEOPLE)

ADDITIONAL DISH

SALES FLOOR

SHOPPING SUPPORT APPARATUS, SHOPPING CART, AND METHOD FOR SHOPPING SUPPORT

CROSS-REFERENCE TO RELATED APPLICATION

This application is based upon and claims the benefit of priority from Japanese Patent Application No. 2022-193785, filed Dec. 2, 2022, the entire contents of which are incorporated herein by reference.

FIELD

Embodiments described herein relate generally to an information processing apparatus for shopping support purposes, a shopping cart incorporating such an apparatus, and a method for such an apparatus.

BACKGROUND

In the related art, if a customer does not know where a target commodity is displayed on a sales floor of an unfamiliar store, and the customer may refer to a guide diagram or map of the sales floor posted at a predetermined position within the store. When going shopping without first deciding which commodity to purchase, a customer may purchase unnecessary commodities.

However, often a customer may not be able to check the layout of commodities on the sales floor or create a list of commodities to purchase before arriving for shopping at the store sales floor.

BRIEF DESCRIPTION OF THE DRAWINGS

FIG. 5 is a diagram showing an example of a commodity registration image.

FIG. 7 is a diagram showing an example of a dish ingredient image.

DETAILED DESCRIPTION

In general, an information processing apparatus for providing shopping support services to a customer on a store sales floor, a shopping cart incorporating such an apparatus, and a method for supporting shopping on a store sales floor are provided.

According to one embodiment, a shopping support apparatus includes a display screen and a control unit. The control unit is configured to cause a store map for a store to be displayed on the display screen. The control unit is configured to acquire a commodity code for a commodity for sale in the store and register the commodity corresponding to the acquired commodity code in a sales transaction list. The control unit is configured to cause the sales transaction list to be displayed on the display screen along with a button for requesting a recipe for a dish including the commodity. The control unit is configured to acquire one or more recipes for a dish including the commodity for when the button is pressed and display images associated with the acquired one or more recipes on the display screen along with an ingredient list button for each of the one or more recipes. The control unit is configured to display a list of ingredients for a selected dish when the ingredient list button for the selected dish is selected on the display screen. The control is also configured to cause a location of an unregistered commodity on the list of ingredients for the selected dish to be displayed on the store map.

Hereinafter, certain example embodiments of an information processing apparatus, a shopping cart (cart), and a method will be described with reference to the accompanying drawings. The embodiments described below are non-limiting. In an example application of an embodiment, a commodity registration apparatus is mounted on a shopping cart.

Figure 1:
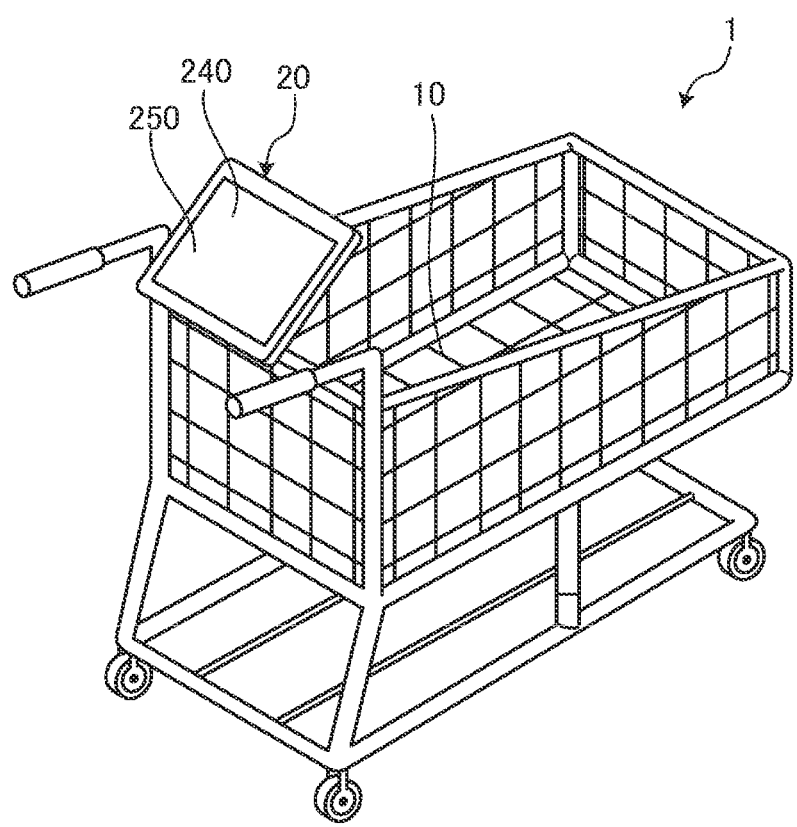
FIG. 1 is an external perspective view showing an example of a shopping cart according to an embodiment.

FIG. 1 is an external perspective view of a shopping cart 1 according to the present embodiment. The shopping cart 1 is a cart on which commodities collected by a customer in a store can be placed. The shopping cart 1 includes a carrier portion 10 and a commodity registration apparatus 20. A commodity or the like to be purchased by a customer is placed on/in the carrier portion 10.

In the present example, a wireless tag is attached to the commodities sold by the store. The wireless tag is a tag that transmits stored information by wireless communication. For example, the wireless tag is a radio frequency (RF) tag or "RFID" tag. The wireless tag stores a commodity code, which is identification information for identifying the commodity to which the wireless tag is attached. The wireless tag transmits the commodity code when interrogated or the like.

The commodity registration apparatus 20 can be an information processing apparatus such as a smart phone or a tablet terminal. The commodity registration apparatus 20 receives the commodity code from the wireless tag attached to the commodity placed on the carrier portion 10. Accordingly, the commodity registration apparatus 20 registers the commodity as an item (commodity) to be sold to the customer.

The commodity registration apparatus 20 also includes a display unit 240 that displays various images. In the present example, the commodity registration apparatus 20 can display a map showing a position where particular commodities are displayed in the store (item display location). The commodity registration apparatus 20 may also display a dish (a "suggested dish") which incorporates the particular commodity as an ingredient. Accordingly, the commodity registration apparatus 20 supports shopping of the customer by providing item display locations and suggested dishes. The commodity registration apparatus 20 is one example of an information processing apparatus.

Next, a hardware configuration of the commodity registration apparatus 20 will be described.

Figure 2:
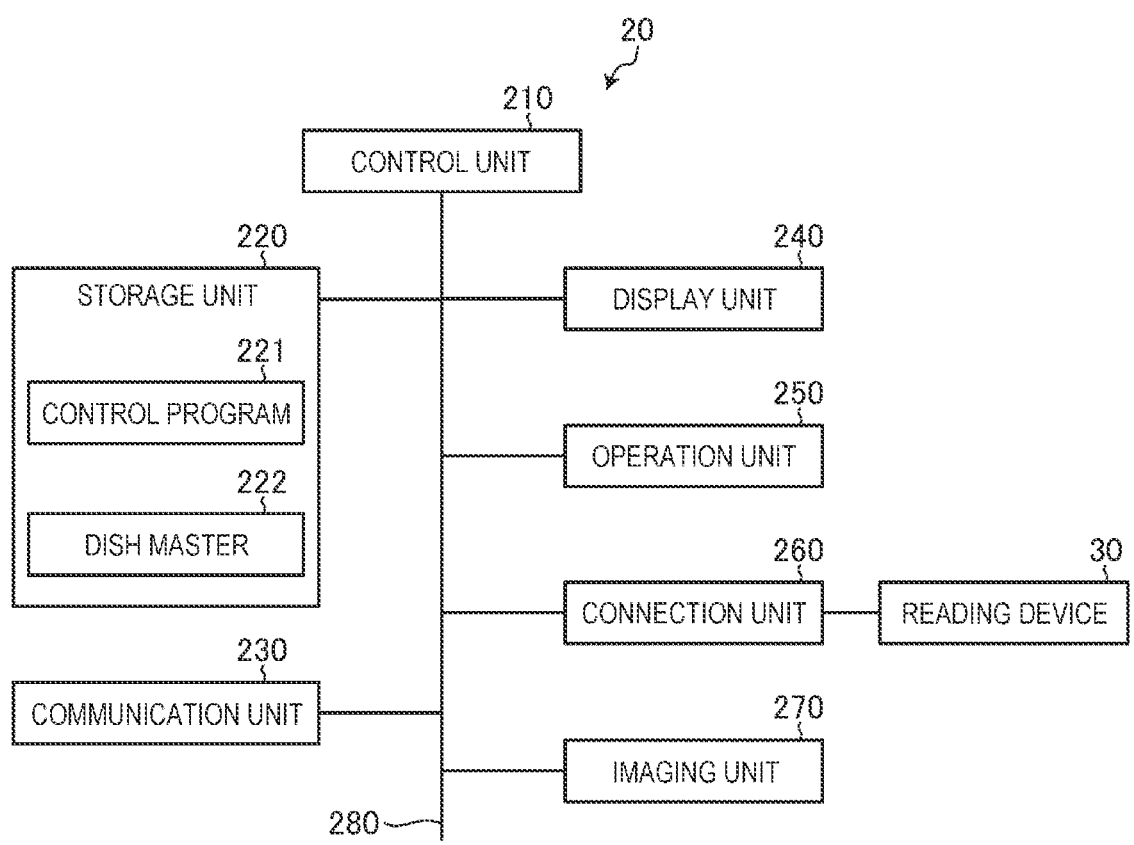
FIG. 2 is a diagram of a commodity registration apparatus.

FIG. 2 is a diagram showing an example of the hardware configuration of the commodity registration apparatus 20. The commodity registration apparatus 20 includes a control unit 210, a storage unit 220, a communication unit 230, a display unit 240, an operation unit 250, a connection unit 260, and an imaging unit 270. These units are interconnected via a system bus 280 such as a data bus or an address bus.

The control unit 210 is a computer that controls an overall operation of the commodity registration apparatus 20 to implement the various described functions of the commodity registration apparatus 20. The control unit 210 includes a processor, a read only memory (ROM), and a random access memory (RA). The processor is a processing circuit such as a central processing unit (CPU), which controls the commodity registration apparatus 20. The ROM is a storage medium that stores various programs and data. The RAM is a storage medium that temporarily stores various programs and various data. The processor executes a program stored in the ROM, the storage unit 220, or the like using the RAM as a work area.

The storage unit 220 is a storage device such as a flash memory. The storage unit 220 stores a control program 221, a dish master 222, and the like. In other examples, the dish master 222 may be stored in another storage medium. For example, the dish master 222 may be stored in a server accessible by the commodity registration apparatus 20.

The control program 221 may operate in conjunction with an operating system, other programs, or the like to provide the described functions and/or processing of the commodity registration apparatus 20.

The dish master 222 is an information database or the like in which dish information for a plurality of different dishes is stored. In this context, each piece of dish information is associated with a dish classification, a dish name, ingredients, quantities, and the like. The dish classification identifies which particular class/group to which a dish belongs. For example, in the present embodiment, the dish classifications include "recommended", "low calorie", "low sugar", and "low fat". The dish name is a common name of a dish. The "ingredient" or "ingredients" portion of the dish information identifies those commodities (items) to be used in the making of the dish. The "quantity" or "quantities portion" of the dish information provides the amount of each ingredient required to make the dish (of the nominal serving size).

The communication unit 230 is an interface that communicates with an external apparatus via a network.

The display unit 240 is a display device that displays various images. For example, the display unit 240 is a liquid crystal display.

The operation unit 250 is an input device that receives various user operations or inputs. For example, the operation unit 250 is a touch panel or hardware buttons arranged on the display unit 240.

The connection unit 260 is an interface for connection with a reading device 30. For example, the connection unit 260 communicates with the reading device 30 according to a standard of a universal serial bus (USB) or the like. For example, the reading device 30 is a device that reads a wireless tag by a short-range wireless communication protocol. Via the connection unit 260, the commodity registration apparatus 20 acquires information read from the wireless tag by the reading device 30.

The imaging unit 270 is a camera including an imaging element such as a complementary metal-oxide semiconductor (CMOS) or a charge coupled device (CCD).

Next, certain functions of the commodity registration apparatus 20 will be described.

Figure 3:
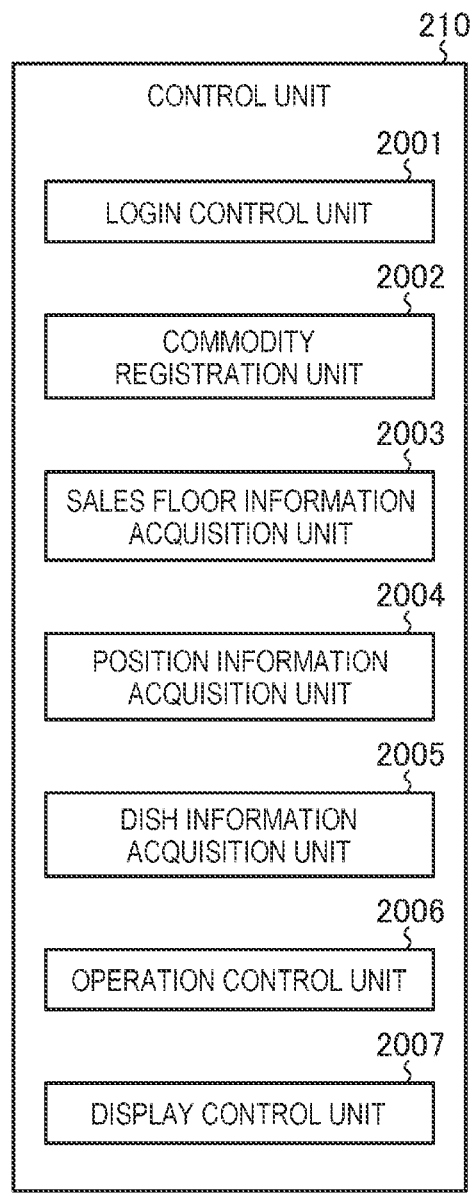
FIG. 3 is a block diagram depicting certain functional aspects of a commodity registration apparatus.

FIG. 3 is a block diagram showing an example of a functional configuration of the commodity registration apparatus 20. The processor provided in the control unit 210 of the commodity registration apparatus 20 loads the control program 221 stored in the storage unit 220 into the RAM, and operates according to the control program 221 to generate each functional unit as depicted in FIG. 3. The control unit 210 of the commodity registration apparatus 20 thus provides the functions of a login control unit 2001, a commodity registration unit 2002, a sales floor information acquisition unit 2003, a position information acquisition unit 2004, a dish information acquisition unit 2005, an operation control unit 2006, and a display control unit 2007.

The login control unit 2001 controls login operations of a user/operator of the commodity registration apparatus 20. More particularly, the login control unit 2001 acquires customer information for identifying a customer who uses the apparatus. The login control unit 2001 is an example of an acquisition unit. For example, the customer information includes a customer code, which is identification information for identifying the customer, customer attribute information such as age and sex, and history information. In this example, history information includes a purchase history, which is a history of commodities purchased by the customer, a selection history of dishes selected by the customer, and the like.

The commodity registration unit 2002 registers a commodity to be sold to the customer. The commodity registration unit 2002 is an example of a registration unit. For example, the commodity registration unit 2002 registers a commodity identified by a commodity code read by the reading device 30. That is, the commodity registration unit 2002 registers a commodity having a commodity code received from a wireless tag when the commodity is placed on the carrier portion 10. In some instances, the commodity registration unit 2002 may acquire a commodity code by capturing an image of a code symbol (such as a bar code) with the imaging unit 270. The commodity registration unit 2002 may then register the commodity identified by the acquired commodity code in the customer transaction. In some other instances, commodity registration unit 2002 may register a commodity identified by an input operation received by the operation unit 250 (e.g., a typing in of commodity code or a selection of a commodity from a displayed menu of options).

The sales floor information acquisition unit 2003 acquires information about the sales floor such as a sales floor image 310 (see FIG. 4), advertisement information, and display information. For example, the sales floor information acquisition unit 2003 acquires sales floor image 310, advertisement information, and display information from a server apparatus.

The sales floor image 310 depicts an arrangement of display areas on the sales floor (a store layout or store map). For example, the sales floor is divided into display areas for each commodity classification, such as a fresh fish area, a meat area, and a fruit and vegetable area. In general, each commodity is displayed in the corresponding display area according to the commodity classification to which the commodity belongs. The possible display areas are not necessarily limited to the commodity classification groupings, and the display areas may be distinguished or divided according to a commodity shelf number, aisle number, or the like.

In this context, advertisement information is advertising for a commodity sold in the store. For example, the advertisement information is an image of a leaflet, print ad, or a flyer for the store. In this example, advertisement information is associated with display area identification information for identifying a display area in the store. The commodity registration apparatus 20 displays the advertisement information associated with particular display area identification information when selected.

In some examples, the sales floor information acquisition unit 2003 may acquire the advertisement information according to the customer information acquired by the login control unit 2001. More specifically, the sales floor information acquisition unit 2003 may acquire the advertisement information for a commodity according to a selection made based on attributes of the customer as indicated by the customer information. The sales floor information acquisition unit 2003 may also select or acquire the advertisement information based on the history information. The sales floor information acquisition unit 2003 may acquire or select the advertisement information for a particular commodity based on the purchase history of the customer as indicated by the customer information.

The display information indicates a display area where a commodity is displayed. That is, the display information includes commodity information indicating a particular commodity and display area identification information indicating the display area where this commodity is displayed. The display information may further include more detailed position information indicating where within a particular display area the commodity is located.

The commodity information includes information such as a commodity code, a commodity classification, a commodity item, a quantity, a price, and an appearance image. The commodity code is identification information for identifying the commodity. The commodity classification is information indicating a classification of the commodity. For example, the commodity classification is one of the classifications: "meat", "fruit and vegetable", "fresh fish". The "commodity item" information indicates certain details or aspects related to different versions or the like of the commodity available (or potentially so) at the store. For example, the commodity item information can indicate different sizes, brands, manufacturers, or the like. For example, in a particular instance, the commodity item information indicates each of the different types of curry powder available at the store. The quantity information indicates a required amount of the commodity. The price information indicating a present price of the commodity at the store. The appearance image is a photograph or the like of the commodity.

The position information acquisition unit 2004 acquires position information indicating a present position of the apparatus in the store. For example, the position information acquisition unit 2004 acquires an IP address of a wireless router or the like in the store, then acquires the position information for the apparatus based on a known/registered position of the router. In other examples, position information acquisition unit 2004 may acquire the position information using a positioning system such as a global navigation satellite system (GNSS). In general, the position information acquisition unit 2004 may acquire the position information by any available method.

The dish information acquisition unit 2005 may acquire dish information from a server apparatus or the like and register the dish information in the dish master 222.

For example, the dish information acquisition unit 2005 acquires/selects dish information for a dish based on the customer information acquired by the login control unit 2001. More specifically, the dish information acquisition unit 2005 acquires the dish information corresponding to the attributes of the customer indicated by the customer information and/or the purchase history of the customer. The dish information acquisition unit 2005 can acquire or select the dish information according to a preference of the customer that has been estimated based on the purchase history. The dish information acquisition unit 2005 may also or instead acquire the dish information according to the selection history of the dishes as indicated by the customer information. That is, the dish information acquisition unit 2005 attempts to acquire dish information corresponding to the taste preferences of the customer as estimated based on the selection history of the dishes.

The operation control unit 2006 receives various input operations from the operation unit 250. For example, the operation control unit 2006 receives an operation of selecting a dish from a list of dishes such as a dish list image 500 (see FIG. 6) and an additional dish image 800 (see FIG. 9). The operation control unit 2006 is an example of a selection unit.

The display control unit 2007 displays various images on the display unit 240.

Figure 4:
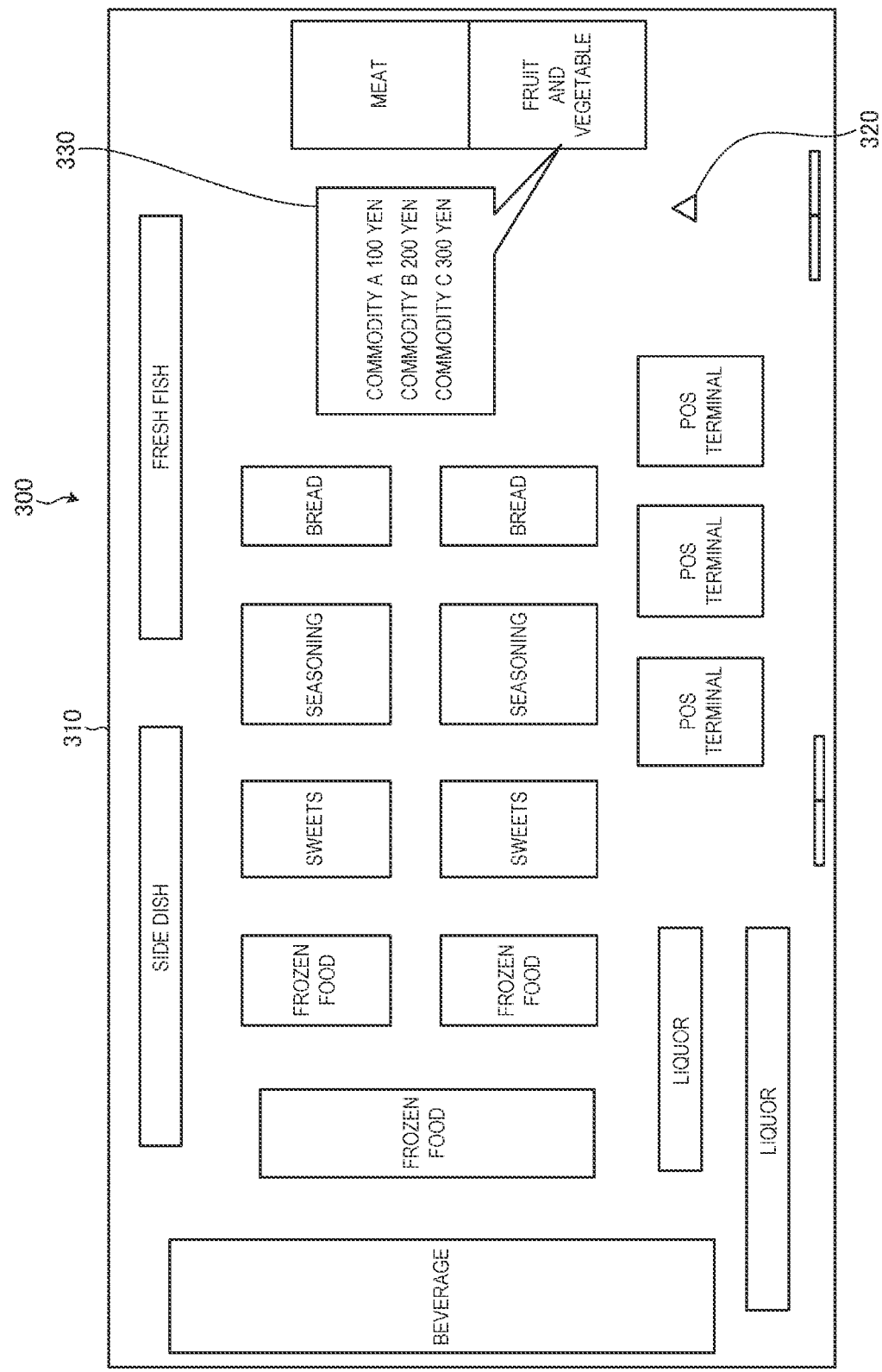
FIG. 4 is a diagram showing an example of a first guide image.

For example, the display control unit 2007 displays the sales floor image 310. FIG. 4 is a diagram showing an example of a first guide image 300. The first guide image 300 is the sales floor image 310 on which an advertisement image 330 is superimposed. For example, the display control unit 2007 displays the sales floor image 310 showing an arrangement of display areas.

The display control unit 2007 displays an icon 320 indicating a present position of the apparatus in the store based on position information acquired by the position information acquisition unit 2004. More specifically, the display control unit 2007 identifies a position on the sales floor image 310 corresponding to the acquired position information. The display control unit 2007 displays the icon 320 to mark the identified position.

The display control unit 2007 may superimpose the advertisement image 330 on the sales floor image 310. More specifically, when an operation of tapping a display area on the sales floor images 310 is received by the operation control unit 2006, the display control unit 2007 generates the advertisement image 330 showing a commodity name, a price, an appearance, and the like of an advertisement target based on advertisement information associated with the tapped display area. The display control unit 2007 displays the advertisement image 330 near the tapped area, for example.

When a commodity is registered in the sales transaction by the commodity registration unit 2002, the display control unit 2007 displays a commodity registration image 400. FIG. 5 is a diagram showing an example of the commodity registration image 400. The commodity registration image 400 includes a commodity list image 410, a total amount image 420, and a dish button 430. The commodity list image 410 is an image showing a list of commodities registered by the commodity registration unit 2002. The total amount image 420 is an image showing a total amount (summed prices) for the commodities registered by the commodity registration unit 2002. The dish button 430 is a button for displaying a list of dishes (recipes) each using at least one of the already registered commodities as an ingredient.

Figure 6:
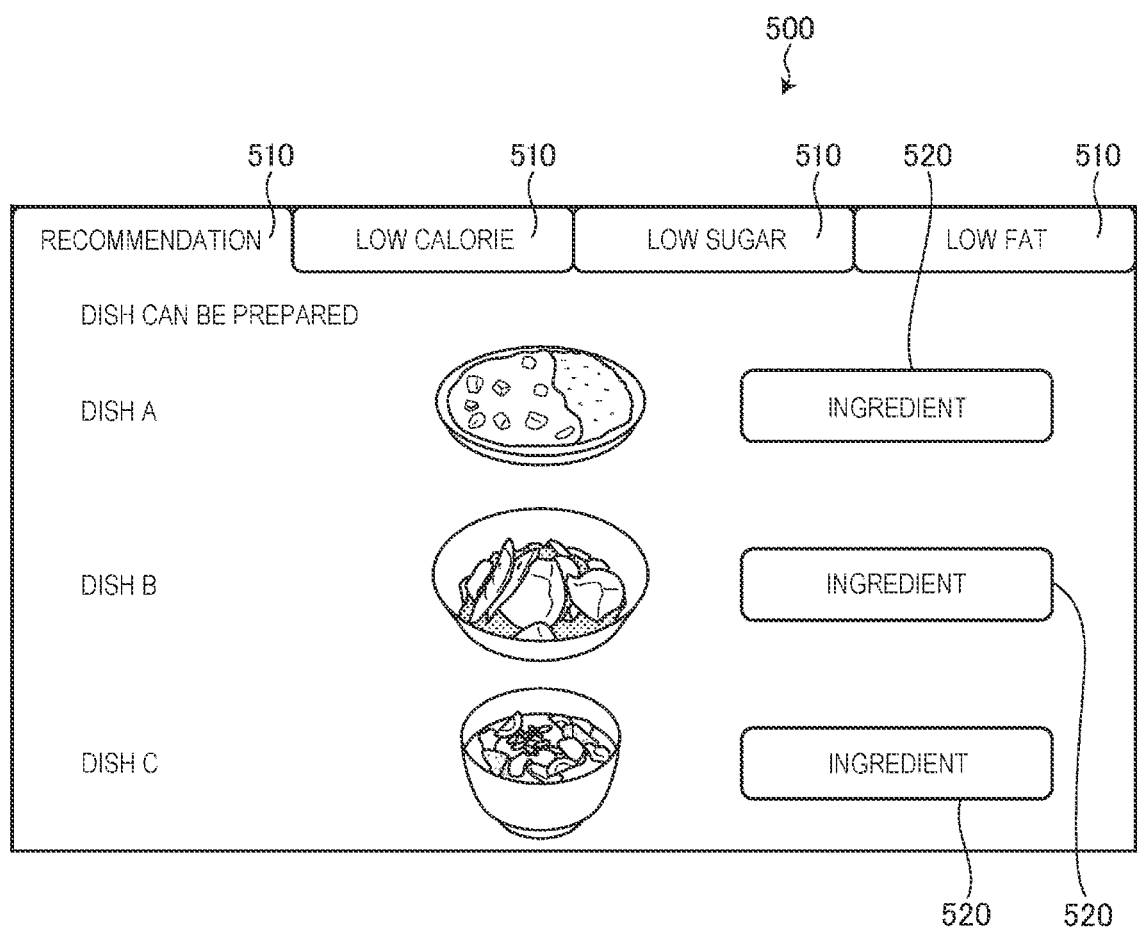
FIG. 6 is a diagram showing an example of a dish list image.

The pressing/selection of the dish button 430 is received by the operation control unit 2006, the display control unit 2007 displays the dish list image 500 (see FIG. 6) based on the dish master 222. FIG. 6 is a diagram showing an example of the dish list image 500. The dish list image 500 provides a list of dishes each using at least one of the commodities registered by the commodity registration unit 2002.

The dish list image 500 can show dishes for each of several dish classification tags 510. A dish classification tag 510 is tab or the like for a particular dish classification. For example, the dish classification tags 510 are for classifications of "recommendation", "low calorie", "low sugar", and "low fat". The dish list image 500 includes an ingredient button 520 for each of the dishes. The ingredient button 520 is a button for displaying a list of commodities to be used as ingredients in the associated dish.

In this example, the dish information acquisition unit 2005 acquires dish information for dishes corresponding to customer information including attribute information and history information, and registers the dish information in the dish master 222. Then, the display control unit 2007 displays the dish list image 500 based on dishes stored in the dish master 222. In general, the display control unit 2007 displays the dish list image 500 set based on the customer information acquired by the login control unit 2001. That is, the display control unit 2007 displays the dish classification tags 510 corresponding to the attribute information of the customer, purchase history of the customer, selection history of dishes of the customer, and the like.

When a commodity is registered by the commodity registration unit 2002, the display control unit 2007 may update the dish list image 500 showing dishes each using the registered commodity as an ingredient. The display control unit 2007 may update the dish list image 500 to show dishes using a plurality of registered commodities. That is, the display control unit 2007 may narrow down dishes in the dish master 222 to only those dishes using multiple registered commodities as ingredients.

When a pressing of the ingredient button 520 is received by the operation control unit 2006, the display control unit 2007 displays a dish ingredient image 600. In other words, when a dish is selected by use of an ingredient button 520, the display control unit 2007 displays the dish ingredient image 600 corresponding to the selected dish. FIG. 7 is a diagram showing an example of a dish ingredient image 600. The dish ingredient image 600 includes an ingredient list image 610, a sales floor button 620, and an additional dish button 630.

The ingredient list image 610 is a list of commodities to be used as ingredients in the selected dish. The ingredient list image 610 indicates position display, a commodity name, a quantity, and collection necessity for each commodity on the ingredient list. A position display field includes a check box for setting whether to display, on the sales floor image 310 or the like, a position where the commodity is located. The position display field of the ingredient list image 610 as shown in FIG. 7 is set to display positions where "onion" and "curry powder" are located. A commodity name field is for displaying a name of the commodity. A quantity field is for displaying a quantity of the commodity to be used as an ingredient of the dish. A collection necessity field is for displaying whether the commodity is collected. In other words, the collection necessity field is for displaying whether collection of the commodity is still required. When the corresponding commodity is registered by the commodity registration unit 2002, the display control unit 2007 displays that the commodity has been collected in the collection necessity field.

The sales floor button 620 is a button for receiving a request for displaying of the sales floor image 310. That is, the sales floor button 620 is a button for receiving an operation for displaying the sales floor image 310 showing a position of a commodity for which the check box of the position display field is checked.

The additional dish button 630 is a button for receiving a request to display other dishes which can be prepared using commodities estimated to still remain after the present dish has been prepared. That is, the additional dish button 630 is a button for receiving an operation for displaying dishes that might be prepared using any remaining commodities after the dish indicated by the dish ingredient image 600 has been prepared.

The dish ingredient image 600 is not limited to just inclusion of a listing of commodities to be used as ingredients for the dish, but may additionally include recipe details related to the cooking method for the dish or the like. The dish ingredient image 600 is not necessarily limited to ingredients sold in the store, and may include other ingredients, such as common items (household staples) expected to be available to the customer at home or the like.

Figure 8:
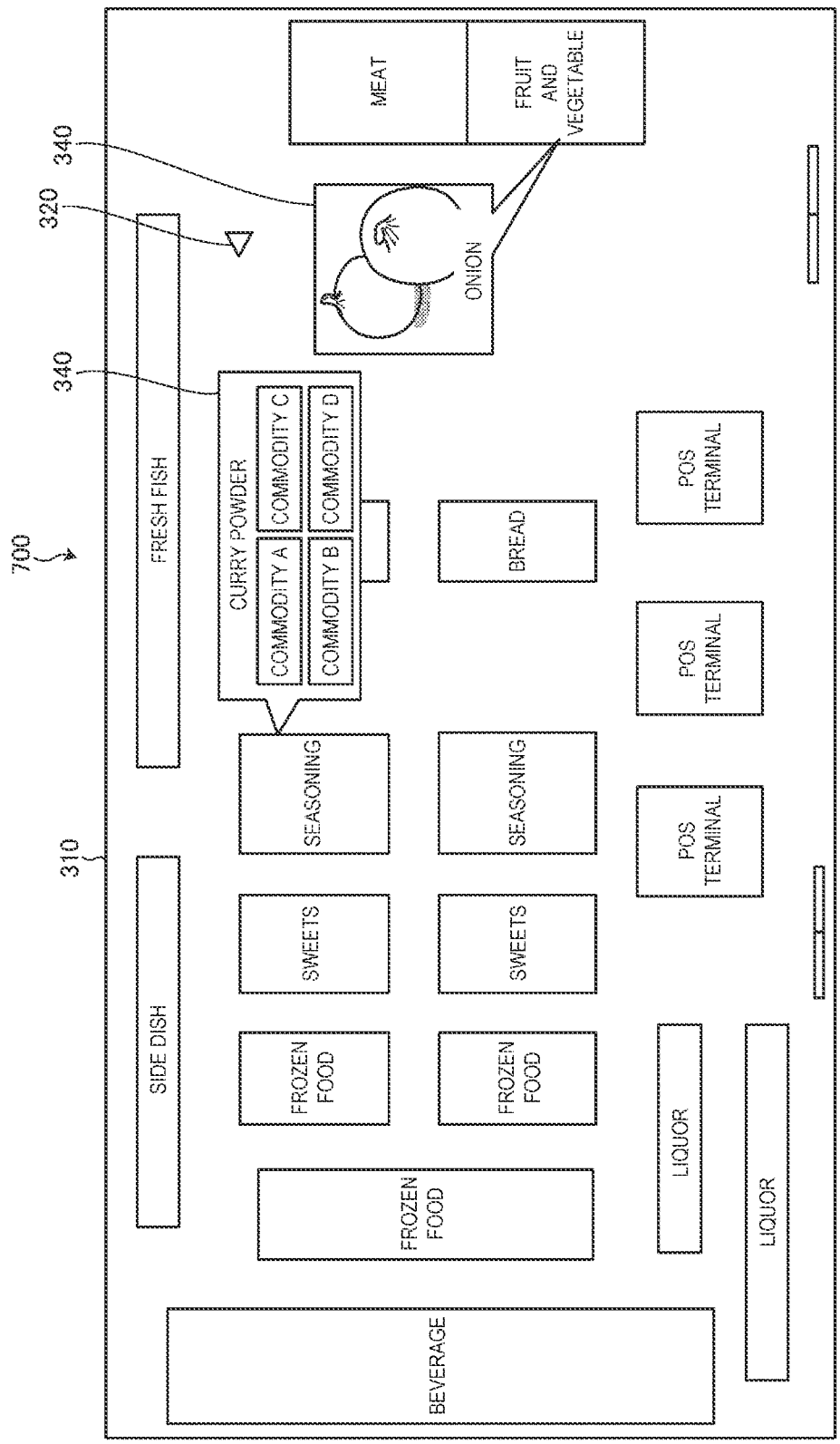
FIG. 8 is a diagram showing an example of a second guide image.

FIG. 8 is a diagram showing an example of a second guide image 700. The second guide image 700 is a diagram showing an example of the sales floor image 310 on which commodity images 340 are superimposed. That is, the display control unit 2007 displays a position where a commodity (ingredient) not yet registered by the commodity registration unit 2002 is displayed. The display control unit 2007 is an example of the second display control unit.

The display control unit 2007 displays the commodity image 340 for a commodity in association with a position where the commodity is located in the sales floor image 310. The commodity image 340 can be a picture of the commodity or other representation. For example, the display control unit 2007 generates the commodity image 340 based on commodity information including an appearance image. Accordingly, the customer can grasp the position where the particular commodity indicated by the commodity image 340 is located within the store.

The display control unit 2007 displays the commodity image 340 for any commodity with a checked check box in the position display field of the ingredient list image 610. In other words, the display control unit 2007 does not display the commodity images 340 for any ingredient without a checked check box. Accordingly, the display control unit 2007 prevents the commodity images 340 for items not selected by the customer from being displayed.

When there are a plurality of items (options) of the corresponding commodity, the display control unit 2007 may display the commodity image 340 for each item (option). In FIG. 8, since there are four items of curry powder, the display control unit 2007 display the commodity image 340 with the four items (options). Accordingly, the customer can select a commodity according to personal preference.

Figure 9:
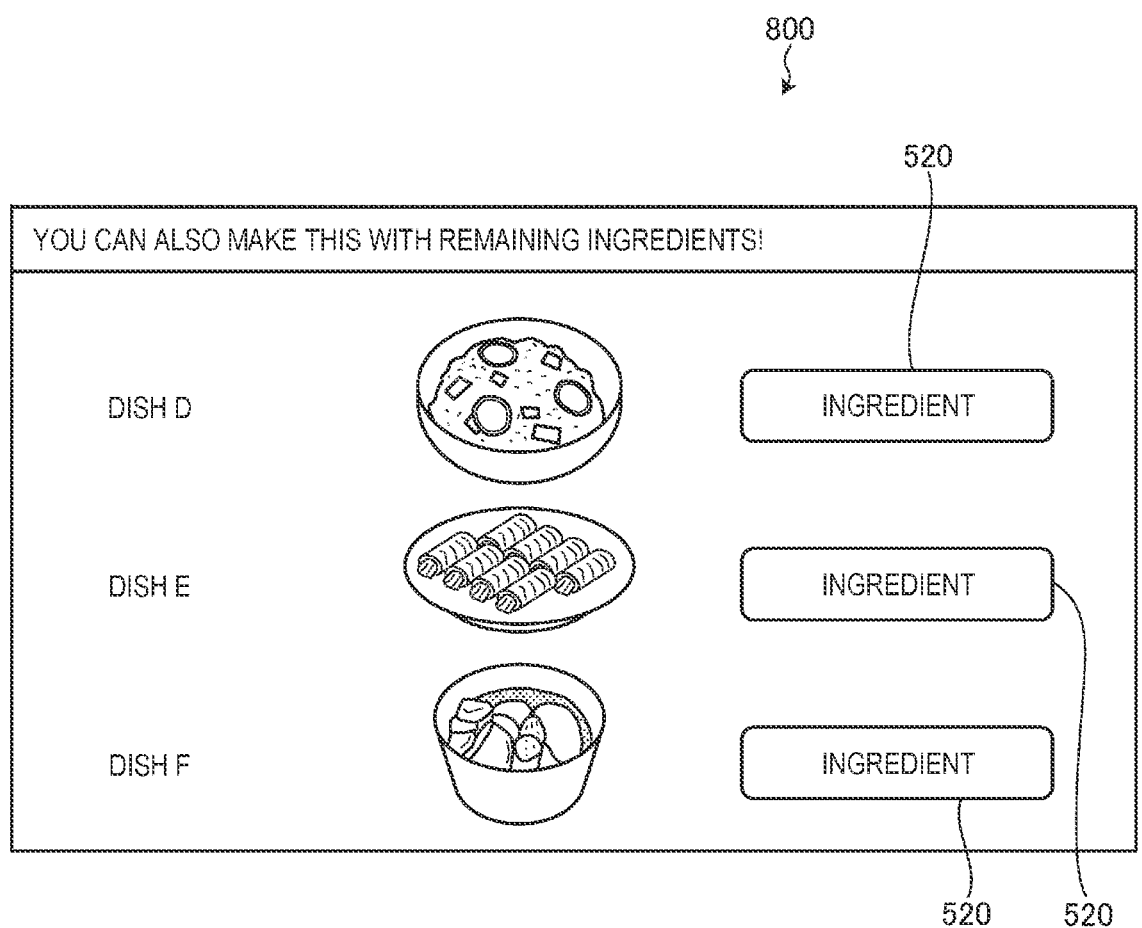
FIG. 9 is a diagram showing an example of an additional dish image.

FIG. 9 is a diagram showing an example of the additional dish image 800. The additional dish image 800 displays dishes which can be prepared using those registered commodities remaining after the dish indicated by the dish ingredient image 600 is prepared.

The additional dish image 800 includes an ingredient button 520 for each dish. The ingredient button 520 is a button for receiving an operation for displaying ingredients of the corresponding dish. For example, when the ingredient button 520 is pressed, the display control unit 2007 displays a dish ingredient image 600 for the selected dish.

Figure 10:
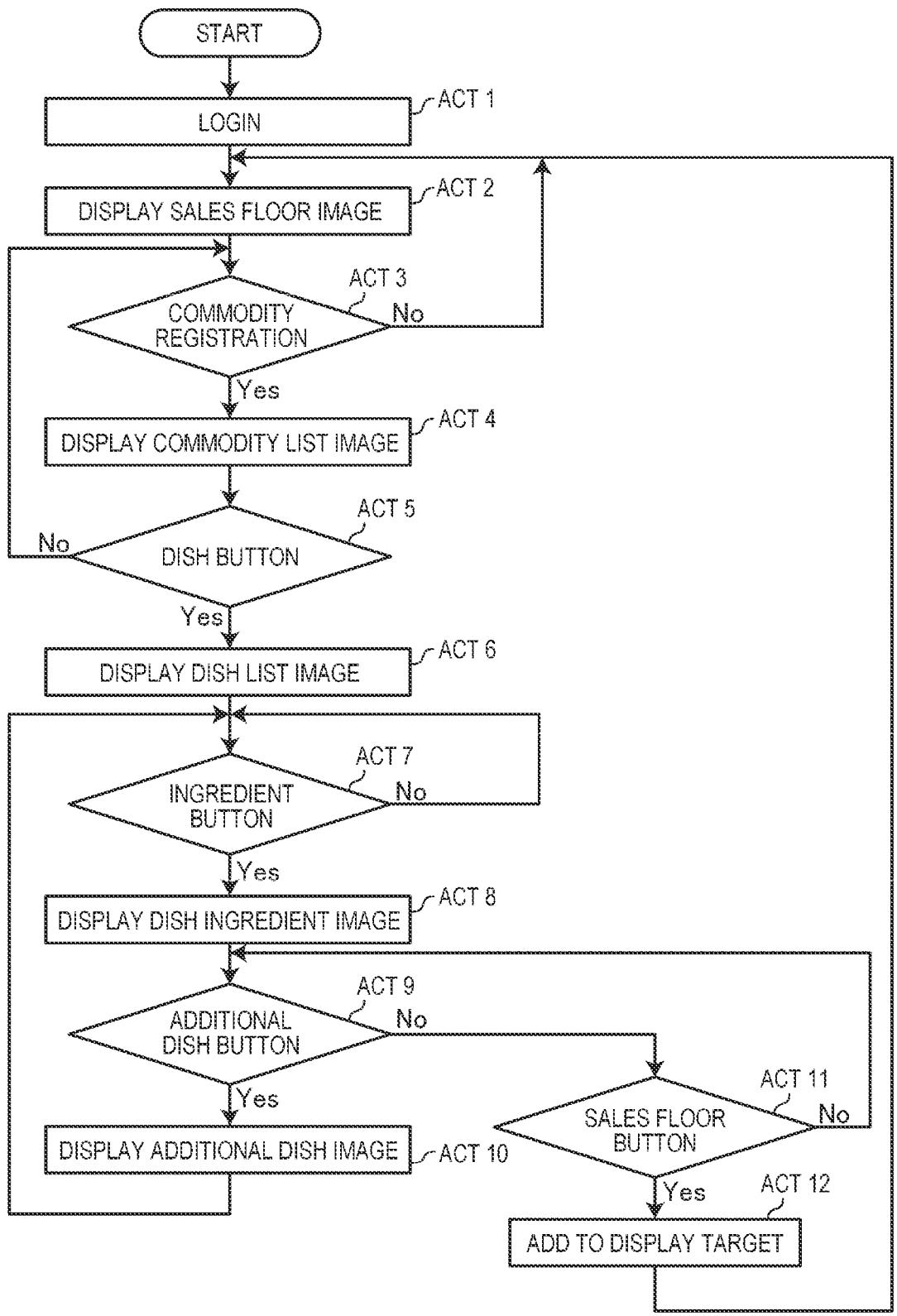
FIG. 10 is a flowchart of shopping support processing executed by a commodity registration apparatus.

Next, certain aspects of a shopping support processing method executed by a commodity registration apparatus 20 according to an embodiment will be described. FIG. 10 is a flowchart of the shopping support processing executed by the commodity registration apparatus 20.

The login control unit 2001 executes login processing for a customer (ACT 1). In other words, the login control unit 2001 acquires customer information including history information and attribute information based on the login operation of the customer.

The display control unit 2007 then displays the sales floor image 310 with the icon 320 showing a position of the commodity registration apparatus 20 (ACT 2). When a display area is tapped on the sales floor image 310, the display control unit 2007 displays an advertisement image 330 based on advertisement information associated with the tapped display area.

The commodity registration unit 2002 determines whether commodity registration processing for registering a commodity code has been executed (ACT 3).

The display control unit 2007 displays the commodity registration image 400 showing a list of commodities registered in the transaction (ACT 4).

The operation control unit 2006 determines whether the dish button 430 has been pressed (ACT 5). When the dish button 430 has not been pressed (ACT 5; No), the commodity registration apparatus 20 returns to ACT 3.

When the dish button 430 has been pressed (ACT 5; Yes), the display control unit 2007 displays a dish list image 500 showing a list of dishes, each of which can be prepared using the commodities already registered by the commodity registration unit 2002 as ingredients (ACT 6).

The operation control unit 2006 next determines whether the ingredient button 520 has been pressed (ACT 7). When the ingredient button 520 has not been pressed (ACT 7; No), the commodity registration apparatus 20 waits.

When the ingredient button 520 has been pressed (ACT 7; Yes), the display control unit 2007 displays a dish ingredient image 600 showing commodities to be used as ingredients of the dish (ACT 8).

The operation control unit 2006 determines whether the additional dish button 630 has been pressed (ACT 9). When the additional dish button 630 has been pressed (ACT 9; Yes), the display control unit 2007 displays an additional dish image 800 showing a list of dishes, each of which can be prepared using remaining commodities (ACT 10). Then, the commodity registration apparatus 20 returns to ACT 7.

When the additional dish button 630 has not been pressed (ACT 9; No), the operation control unit 2006 determines whether an operation the sales floor button 620 has been pressed (ACT 11). If not received (ACT 11; No), the commodity registration apparatus 20 returns to ACT 9.

If the sales floor button 620 has been pressed (ACT 11; Yes), the display control unit 2007 identifies the commodity image 340 of any commodity with a checked check box in the position display field of the ingredient list image 610 as a display target (ACT 12). Then, in ACT 2, the display control unit 2007 displays a sales floor image 310 with the added display target commodity images 340 superimposed.

As described above, a commodity registration apparatus 20 according to the present embodiment registers a commodity to be sold to the customer. The commodity registration apparatus 20 displays a list of dishes each using, as an ingredient, at least one of the commodities to be sold to the customer. Then, when a dish is selected, the commodity registration apparatus 20 displays a position where a commodity not yet registered among the ingredients of the dish is located in the store. Accordingly, even if the customer does not create a list of commodities to be purchased (shopping list) before visiting the store, the customer can identify the necessary commodities to be purchased for preparation of various dishes. Further, even if the customer is unfamiliar with store layout or item locations on the sales floor, the customer can be provided information indicating the relevant item locations of the commodities to be purchased. Therefore, the commodity registration apparatus 20 can support shopping on the sales floor to improve convenience for the customers.

In an embodiment, the commodity registration apparatus 20 includes the login control unit 2001, the commodity registration unit 2002, the sales floor information acquisition unit 2003, the position information acquisition unit 2004, the dish information acquisition unit 2005, the operation control unit 2006, and the display control unit 2007. However, in other examples, all or some of the functions of the login control unit 2001, the commodity registration unit 2002, the sales floor information acquisition unit 2003, the position information acquisition unit 2004, the dish information acquisition unit 2005, the operation control unit 2006, and the display control unit 2007 may be provided in an external server apparatus or the like. In such instances, the commodity registration apparatus 20 may, in essence, function as a browser or the like.

A commodity registration apparatus 20 may transmit customer information and position information to a server apparatus. The server apparatus may then generate all or some of the first guide image 300, the commodity registration image 400, the dish list image 500, the dish ingredient image 600, the second guide image 700, and the additional dish image 800, and cause the commodity registration apparatus 20 to display these generated images as appropriate. Then, upon receiving various input operations from the customer, the commodity registration apparatus 20 transmits each input to the server apparatus. In this manner, the commodity registration apparatus 20 may implement the above functions by cooperating with a server apparatus or the like.

In an embodiment, the commodity registration apparatus 20 is mounted on a shopping cart 1. However, in other examples, the commodity registration apparatus 20 may be an information processing apparatus such as a smart phone or a tablet terminal that is not fixed to the shopping cart 1. Furthermore, in some examples, the commodity registration apparatus 20 may be a smart phone or a tablet terminal owned by the customer and brought to the store.

The program executed by apparatuses according to the described embodiments and modifications may be incorporated in advance in a storage medium (ROM or storage device) of the apparatus itself an provided to a user, but the embodiments are not limited thereto. For example, the program may be separately provided by being recorded in a non-transitory, computer-readable recording medium such as a CD-ROM, a flexible disk (FD), a CD-R, or a digital versatile disk (DVD) as a file in an installable format or an executable format. The program(s) of an embodiment may be provided separately from the apparatus and downloaded, distributed, or accessed through a LAN, the Internet, or other communication network.

While certain embodiments have been described, these embodiments have been presented as examples and are not intended to limit the scope of the present disclosure. These novel embodiments can be implemented in various other forms, and various omissions, replacements, and changes can be made without departing from the spirit of the present disclosure. The accompanying claims and their equivalents are intended to cover such forms or modifications as would fall within the scope of the disclosure.

What is claimed is:

1. A shopping support apparatus, comprising:
a display screen; and
a control unit configured to:

cause a store map for a store to be displayed on the display screen;
receive a commodity code for a commodity for sale in the store from a commodity reader device;
register the commodity corresponding to the received commodity code in a sales transaction list;
display the sales transaction list on the display screen along with a recipe requesting button for requesting one or more recipes for a dish including the commodity corresponding to the received commodity code;
acquire the one or more recipes for a dish including the commodity corresponding to the received commodity code when the recipe requesting button is pressed;
display images associated with the one or more recipes on the display screen along with an ingredient list button for each of the one or more recipes;
display a list of ingredients for a selected dish when the ingredient list button for the selected dish is selected on the display screen; and
cause a location of an unregistered commodity on the list of ingredients for the selected dish to be displayed on the store map, wherein
when more than one commodity has been registered in the sales transaction list, the control unit is further configured to acquire recipes for a dish including a plurality of registered commodities in the sales transaction list.

2. The shopping support apparatus according to claim 1, wherein the control unit is further configured to acquire at least one recipe for a dish including any remaining commodities on the sales transaction list after the selected dish has been selected.

3. The shopping support apparatus according to claim 1, wherein the control unit is further configured to:
acquire a customer identification via a logon operation, wherein
the one or more recipes are acquired based at least in part on customer information associated with the acquired customer identification.

4. The shopping support apparatus according to claim 1, wherein the display screen is a touch screen panel.

5. The shopping support apparatus according to claim 1, wherein the images associated with the one or more recipes are arranged via selectable tabs by recipe classification.

6. The shopping support apparatus according to claim 1, further comprising:
a storage device storing a dish database, wherein
the one or more recipes are acquired from the dish database.

7. The shopping support apparatus according to claim 1, wherein the control unit is further configured to:
acquire position information indicating the present position of the shopping support apparatus in the store; and
display an icon indicating the present position of the shopping support apparatus on the store map.

8. A cart for shopping, the cart comprising:
a carrier portion on which commodities for sale in a store can be placed;
a commodity reader device configured to provide commodity codes of commodities being registered in a sales transaction; and
a shopping support apparatus including:
a display screen; and
a control unit configured to:
cause a store map for the store to be displayed on the display screen;
receive a commodity code for a commodity for sale in the store from the commodity reader device;
register the commodity corresponding to the received commodity code in a sales transaction list;
display the sales transaction list on the display screen along with a recipe requesting button for requesting one or more recipes for a dish including the commodity corresponding to the received commodity code;
acquire the one or more recipes for a dish including the commodity corresponding to the received commodity code when the recipe requesting button is pressed;
display images associated with the one or more recipes on the display screen along with an ingredient list button for each of the one or more recipes;
display a list of ingredients for a selected dish when the ingredient list button for the selected dish is selected on the display screen; and
cause a location of an unregistered commodity on the list of ingredients for the selected dish to be displayed on the store map, wherein
when more than one commodity has been registered in the sales transaction list, the control unit is further configured to acquire recipes for a dish including a plurality of registered commodities in the sales transaction list.

9. The cart according to claim 8, wherein the control unit is further configured to acquire at least one recipe for a dish including any remaining commodities on the sales transaction list after the selected dish has been selected.

10. The cart according to claim 8, wherein the control unit is further configured to:
acquire a customer identification via a logon operation, wherein
the one or more recipes are acquired based at least in part on customer information associated with the acquired customer identification.

11. The cart according to claim 8, wherein the display screen is a touch screen panel.

12. The cart according to claim 8, wherein the images associated with the one or more recipes are arranged via selectable tabs by recipe classification.

13. The cart according to claim 8, further comprising:
a storage device storing a dish database, wherein
the one or more recipes are acquired from the dish database.

14. The cart according to claim 8, wherein the control unit is further configured to:
acquire position information indicating the present position of the cart in the store; and
display an icon indicating the present position of the cart on the store map.

15. A shopping support method, comprising:
causing a store map for a store to be displayed on a display screen;
receiving a commodity code for a commodity for sale in the store from a commodity reader device;
registering the commodity corresponding to the received commodity code in a sales transaction list;
displaying the sales transaction list on the display screen along with a recipe requesting button for requesting one of more recipes for a dish including the commodity corresponding to the received commodity code;

acquiring the one or more recipes for a dish including the commodity corresponding to the received commodity code when the recipe requesting button is pressed;

displaying images associated with the one or more recipes on the display screen along with an ingredient list button for each of the one or more recipes;

displaying a list of ingredients for a selected dish when the ingredient list button for the selected dish is selected on the display screen;

causing a location of an unregistered commodity on the list of ingredients for the selected dish to be displayed on the store map; and when more than one commodity has been registered in the sales transaction list, acquiring recipes for a dish including a plurality of registered commodities.

16. The method according to claim 15, further comprising:

acquiring at least one recipe for a dish including any remaining commodities on the sales transaction list after the selected dish has been selected.

17. The method according to claim 15, further comprising:

acquiring a customer identification via a logon operation, wherein the one or more recipes are acquired based at least in part on customer information associated with the acquired customer identification.

* * * * *